(12) United States Patent
Liu

(10) Patent No.: US 9,609,081 B2
(45) Date of Patent: Mar. 28, 2017

(54) METHOD FOR MANAGED SOCIAL NETWORKING SERVICES

(71) Applicant: QiuYuan Liu, Piedmont, CA (US)

(72) Inventor: QiuYuan Liu, Piedmont, CA (US)

(73) Assignee: QiuYuan Liu, Piedmont, CA (US)

( * ) Notice: Subject to any disclaimer, the term of this patent is extended or adjusted under 35 U.S.C. 154(b) by 348 days.

(21) Appl. No.: 13/861,153

(22) Filed: Apr. 11, 2013

(65) Prior Publication Data

US 2013/0275507 A1  Oct. 17, 2013

Related U.S. Application Data

(60) Provisional application No. 61/622,929, filed on Apr. 11, 2012.

(51) Int. Cl.
*G06F 15/16* (2006.01)
*H04L 29/08* (2006.01)
*G06Q 50/00* (2012.01)

(52) U.S. Cl.
CPC ........... *H04L 67/306* (2013.01); *G06Q 50/01* (2013.01)

(58) Field of Classification Search
CPC ..................... H04L 67/306; G06F 17/3053
USPC .......................................................... 709/204
See application file for complete search history.

(56) References Cited

U.S. PATENT DOCUMENTS

| | | | | |
|---|---|---|---|---|
| 2006/0042483 | A1* | 3/2006 | Work | G06Q 10/00 101/91 |
| 2006/0136419 | A1* | 6/2006 | Brydon et al. | 707/9 |
| 2011/0083101 | A1* | 4/2011 | Sharon | G06F 21/6245 715/800 |
| 2011/0276689 | A1* | 11/2011 | Rosen | G06F 17/3087 709/224 |
| 2012/0131171 | A1* | 5/2012 | Samuel | G06Q 50/01 709/224 |

\* cited by examiner

*Primary Examiner* — Wing F Chan
*Assistant Examiner* — Andrew Woo
(74) *Attorney, Agent, or Firm* — Flener IP Law, LLC; Zareefa B. Flener

(57) ABSTRACT

A method for managing closeness of a connection in SNS is provided and includes: calculating an intimacy distance of a connection based on times of activities or amount of interactions between a user and the other end of the connection, tuning the intimacy distance by other factors the user chooses; controlling the closeness of a connection and in disclosure according to the intimacy distance calculated. With the embodiments of the present invention, a user can control the closeness of a connection and control data disclosure based on the closeness with individual people regardless of their groups or circles.

14 Claims, 4 Drawing Sheets

METHOD FOR MANAGED SOCIAL NETWORKING SERVICES

CROSS-REFERENCE TO RELATED APPLICATION

The application is non-provision application claiming the priority of provision application 61622929 (filed on Apr. 11, 2012), the contents of which are incorporated herein by reference.

FIELD OF THE INVENTION

The embodiments of the present in are related to Social Networking Services (SNS), especially to method of managing closeness of a connection in SNS.

BACKGROUND OF THE INVENTION

In prior art, Facebook and the likes are using a static model to manage connections. As shown in FIG. 1, on Facebook, two factors are presented in one's connection with other people (also called relationship): there is a connection or not and the characterization of the connection. As shown in FIG. 2, connections with the same characterization are grouped into friend lists or groups or circles. If a user wants to control the access to his/her personal data, he/she can only control it at the group level, or manually specify individual people or groups.

In the prior art, a key point that social connections are dynamic in life is ignored.

DETAILED DESCRIPTION OF THE INVENTION

Figure 1:
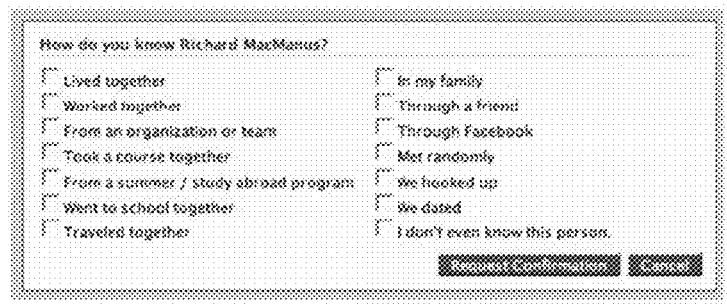
FIG. 1 illustrates characterizations of a connection defined in Facebook in prior art.
Figure 2:
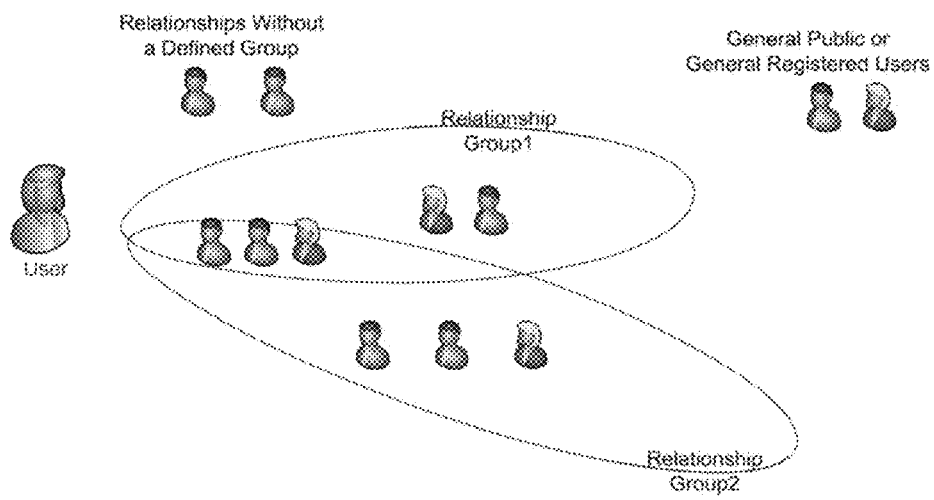
FIG. 2 illustrates a group connection model in prior art.

The embodiments of the present invention are described in more detail hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

The present invention is further described in detail hereinafter with reference to the accompanying drawings as well as embodiments so as to make the objective, technical scheme and merits thereof more apparent.

With the embodiments of the present invention, a user can control the closeness of a connection and control the amount and/or time of data disclosure to the individual people of the connection regardless of the individual's groups or circles. Such services may be named Managed Social Networking Services (MSNS). To maintain or develop a connection a user may need to increase interactions or activities with a target user.

Figure 3:
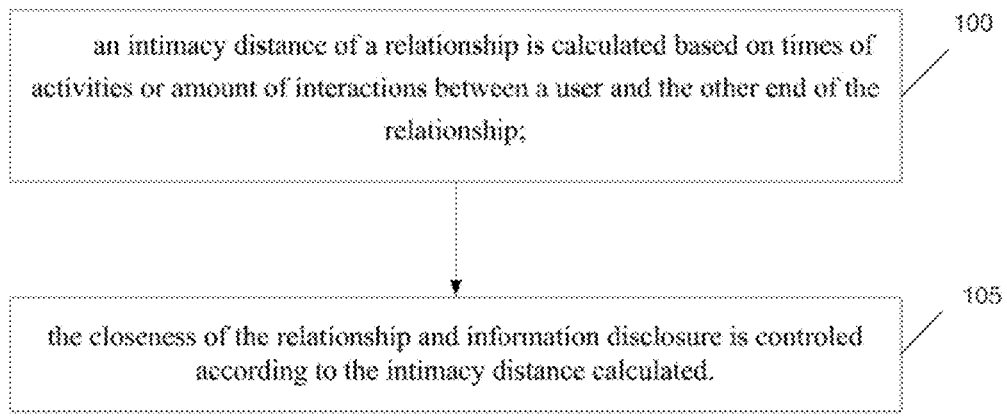
FIG. 3 illustrates a method of managing closeness of a connection in one embodiment of the present invention.

FIG. 3 illustrates a method of managing closeness of a connection in one embodiment of the present invention. In the embodiment, an Intimacy Distance (idis) is measured to define the closeness between a user and his/her connections. This idis will dictate the location of said connections in the user's social connection graph, e.g., regardless whether a connection is in a certain group or not, it may be closer to the user, e.g. a friend of multiple years, or is put far away, e.g. a new obtained acquaintance.

Figure 4:
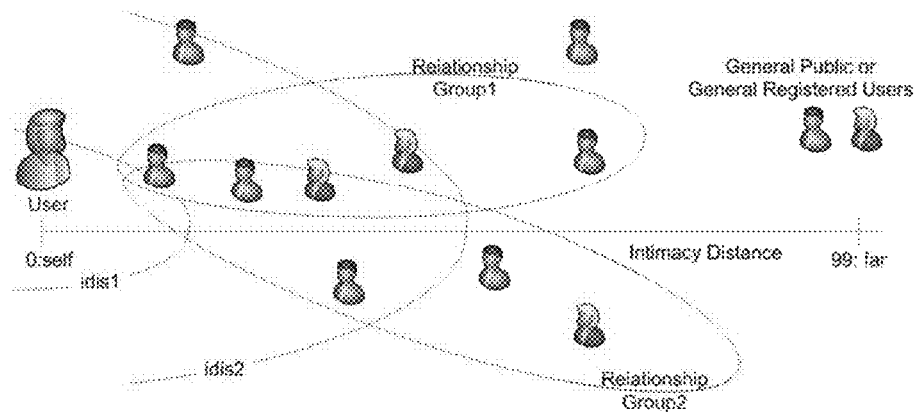
FIG. 4 illustrates intimacy distance between two users and connection groups in managed social networking services.

The method may include following steps:

Step 100: the intimacy distance (idis) is calculated based on times of activities or amount of interactions between a user and the other end of a connection, for example, events attended together, or communications between them, such as, comments back and forth on information a user disclosed or shared, such as photo, story, news or a link etc. As shown in FIG. 4, taking User as a reference, users having the same idis to User may belong to different groups, and users in the same group may have different idis values to User.

In one embodiment, it can be defined that the bigger the idis value of a connection, the closer the connection is.

In one embodiment, it can be defined that the smaller the idis value of a connection, the closer the connection is. In following embodiments, suppose that the smaller the idis value of a connection, the closer the connection is.

Step 105: User controls the closeness of a connection according to the idis value calculated. In one embodiment, User controls how much of his/her data is disclosed to the connection, or how much data the connection can access, e.g. the closer a connection the more personal data it can access.

In one embodiment, a user can completely control the of a connection according to the idis value. In one embodiment, a user can control the amount of his/her personal data disclosure and the time of the disclosure to his/her connections. For example, a user can choose to let his/her close friends having a smaller idis value know his/her whereabout real time and defer the disclosure to not so close friends or general public that have a bigger idis value certain time later.

Figure 5:
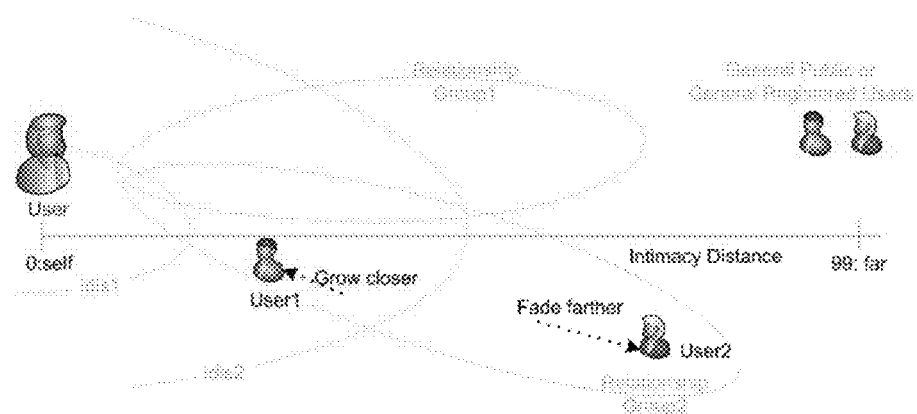
FIG. 5 illustrates a connection dynamically growing closer or fading farther in one embodiment of the present invention.

As shown in FIG. 5, even though User1 and User2 are in the same Group2, User is able to disclose more data to User1 than to User2 based on User1's smaller idis value. We call this idis based disclosure managed disclosure.

A connection may grow closer by interactions or activities of shared interests or ideas, or become dormant and fade farther, as shown in FIG. 5. In one embodiment, such interactions or activities will be calculated into the idis value so that the idis value will change accordingly to smaller or bigger.

In one embodiment, a user may instruct how fast the idis value grows smaller or becomes bigger, or it remains fixed, or assign an idis value directly at any time, e.g. a family member may get a small idis value (a short distance) and is placed close to the user and the user can instruct that the idis value for such a family member remain fixed at a small value. Another example is a casual acquaintance may get a large idis value and is placed far away from the user and fades fast, that's to say, the idis value increases fast.

In an embodiment of the present invention, a parameter is added to make the idis measurement and disclosure management unidirectional. For example, User in FIG. 5 may determine User1 is a close friend to him/her, but User1 may determine User is not a close friend to him/her.

Figure 6:
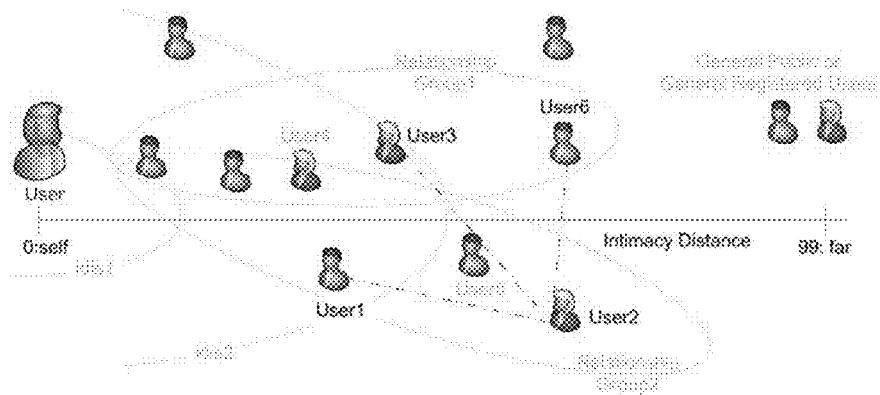
FIG. 6 illustrates an example of connections in managed social networking services in one embodiment of the present invention.
Figure 7:
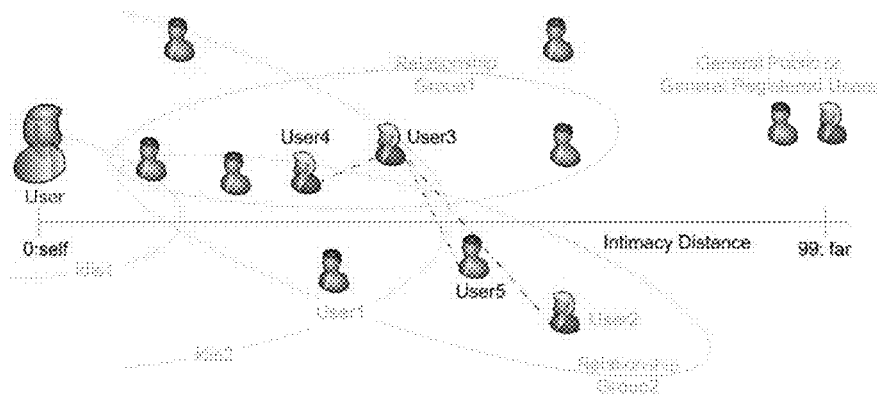
FIG. 7 illustrates another example of connections in managed social networking services in one embodiment of the present invention.

In one embodiment, a user can control whether a connection can be seen by others. For example, in FIG. 6, either User or User5 may choose to hide their connection from User1 and User2, despite User5 are in the same group as User1 and User2. Also, as shown FIG. 6 and FIG. 7, User2 and User5 actually have multiple common friends, e.g. User and User3, but if they choose to hide their connections, they won't be able to see each other in the group.

In one embodiment, a user can initiate to introduce one of his/her connection to another or introduce upon a connection's request. For example, in FIG. 6, User may choose to introduce User5 to User2, or introduce upon User5's request.

In one embodiment, a user can check whether there is a connection between a certain user and other users. For example, in FIG. 6, User checks User2 and knows there is a connection between User2 and User1, User3, User6 respectively. And in FIG. 7, there is a connection between User3 and User2, User4, User5 respectively.

In one embodiment, a user may choose to hide from any unsolicited connection request and let the system act as a proxy to accept the request or not, after reviewing the disclosure from the source. This can help avoid unsolicited relationships without alienating people. For example, in FIG. 7, User5 may be looking for User2 in the SNS system without knowledge whether User2 is hiding or is registered at all, he/she may submit a request to look for such User2 by providing certain info he/she already holds. System acts as a proxy and forwards the request to User2. User2 may accept the request, or reject it. In a case User2 rejects the request, he/she may reject it with or without a reason. For example, one reason may be User2 had unhappy experience with User5. System responds with the acceptation or responds it's not able to help User5 to establish a connection with User2 and the reason may vary. This can protect User2 from unwanted connections and User5 won't know he/she is rejected actually.

In one embodiment, a user may submit a request to the system for searching for a target user by providing certain info of the target user. The system forwards the request to the target user. If the target user accepts the request, he/she will add the user into his/her connections and may assign an idis value to the user. If the target user rejects the request, the system replies the user the request failed. The certain info of the target user may include: any one or combination of name, school name and birth place of the target user.

In one embodiment, one end of a connection is not a human user, but an entity or a service, for example a grocery store. In this case it's the owner or the manager of said service controls the connection with a user. The service may be interested in accessing a user's disclosure, such as the user's brand preference or shopping needs. In this situation, the user can assign an idis measurement to such connection and manage whether, how much and when the service can access his/her disclosure.

To provide better personalized services to users, the service may choose to self-define characterizations of its services, e.g. dining, entertainment, news, shopping, technology etc. so that a user's disclosure can be accessed by relevant services according to the time and/or the location and/or in a context what the user is doing, etc, or that a user only sees relevant services according to the time and/or the location and/or in a context what the user is doing, etc. For example, when a user access services during working time, only services relevant to his/her work, for example technology Services can access his/her disclosure. Another example is during the off time, services such as entertainment or dining can access a user's disclosure.

In one embodiment, both ends of a connection are services. In this situation, a service can assign an idis measurement to such connections and manage whether, how much and when the service on the other end can access its disclosure.

In other embodiments of the present invention, a method for collecting perception information in the advertisement is provided to solve the problem that there is no program that can collect how an advertisement placement is perceived or liked or disliked by viewers.

Figure 8:
FIG. 8 illustrates an example of showing perception anchor points in one embodiment of the present invention.
Figure 9:
FIG. 9 illustrates an example of showing perception collection in one embodiment of the present invention.

As shown in FIG. 8, the heart on each banner advertisement can be served as an anchor point to such method. When clicked, it will be expanded to collect how the advertisement is perceived by the viewer, e.g. it can collect whether the viewer likes it or dislikes it, and/or shares it, and/or comments on it, as shown in FIG. 9.

This invention will add elements so that a small business or businesses that are doing good deeds to society or community may win a better position at a lower price so that small businesses may get some opportunities to jump start or companies doing good are rewarded. We call such elements social elements.

It should be understood that all of the embodiments disclosed in the present invention may be implemented by a computer program. The computer program may comprise program code means adapted to cause a processer in a computing device, such as computer or server or smartphone or tablet etc. to perform the steps of the method described when said computer program is run on a device at a user side. For example, the program code means may be loaded in a memory, such as a RAM (Random Access Memory), from a storage medium or from another device via a computer network. Alternatively, the described features may be implemented by hardwired circuitry instead of software or in combination with software.

It should be understood that all of embodiments disclosed in the present invention can be combined or separated, which still should be considered within the scope of the present invention.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A method for managed social networking services, comprising:
    calculating an intimacy distance of a connection based on times of activities or amount of interactions between a first user and a particular second user who has the connection with the first user, wherein the intimacy distance of the connection varies by interactions and activities of sharing; and
    managing a time of information disclosure and an amount of information disclosure of the first user to the second user according to the intimacy distance calculated.

2. The method of claim 1, further comprising:
    instructing, by the first user, a time interval to calculate the intimacy distance.

3. The method of claim 1, further comprising:
    assigning the calculated intimacy distance directly to the connection.

4. The method of claim 1, wherein a parameter is added to make the calculated intimacy distance and disclosure management unidirectional.

5. The method of claim 1, wherein the first user controls whether the connection can be seen by a third user.

6. The method of claim 1, wherein the first user introduces one of his/her connection to the second user.

7. The method of claim 1, wherein the first user introduces one of his/her connection to the second user upon a request from the one of his/her connection.

8. The method of claim 1, wherein the first user checks whether there is a connection between other users.

9. The method of claim 1, wherein the first user chooses to hide from an unsolicited connection request and lets the system act as a proxy to accept the unsolicited connection request or not.

10. The method of claim 1, wherein when the second user is a service provider, the first user uses the calculated intimacy distance to control the amount of information disclosure and the time of information disclosure to the second user according to a time or a location or a context what the first user is doing.

11. The method of claim 1, wherein when both of the first user and the second user are service providers, the first user uses the calculated intimacy distance to control the amount of information disclosure and the time of information disclosure to the second user, and the second user uses the calculated intimacy distance to control an amount of information disclosure and a time of information disclosure to the first user.

12. The method of claim 1, wherein activities or interactions between the first user and the second user comprises: any one or combination of events attended together, comments back and forth on information each of the first user and the second user disclosed or shared.

13. The method of claim 1, further comprising:
    receiving a request for searching for a target user including target information of the target user;
    adding the target user to the connection if the target user accepts the request.

14. The method of claim 13, the target information of the target user includes: any one or combination of name, school name and birth place of the target user.

* * * * *